Aug. 13, 1940. V. A. TIEDJENS 2,211,445
STRUCTURE FOR GROWING PLANTS IN INERT MATERIAL
Filed Dec. 22, 1938 2 Sheets-Sheet 1
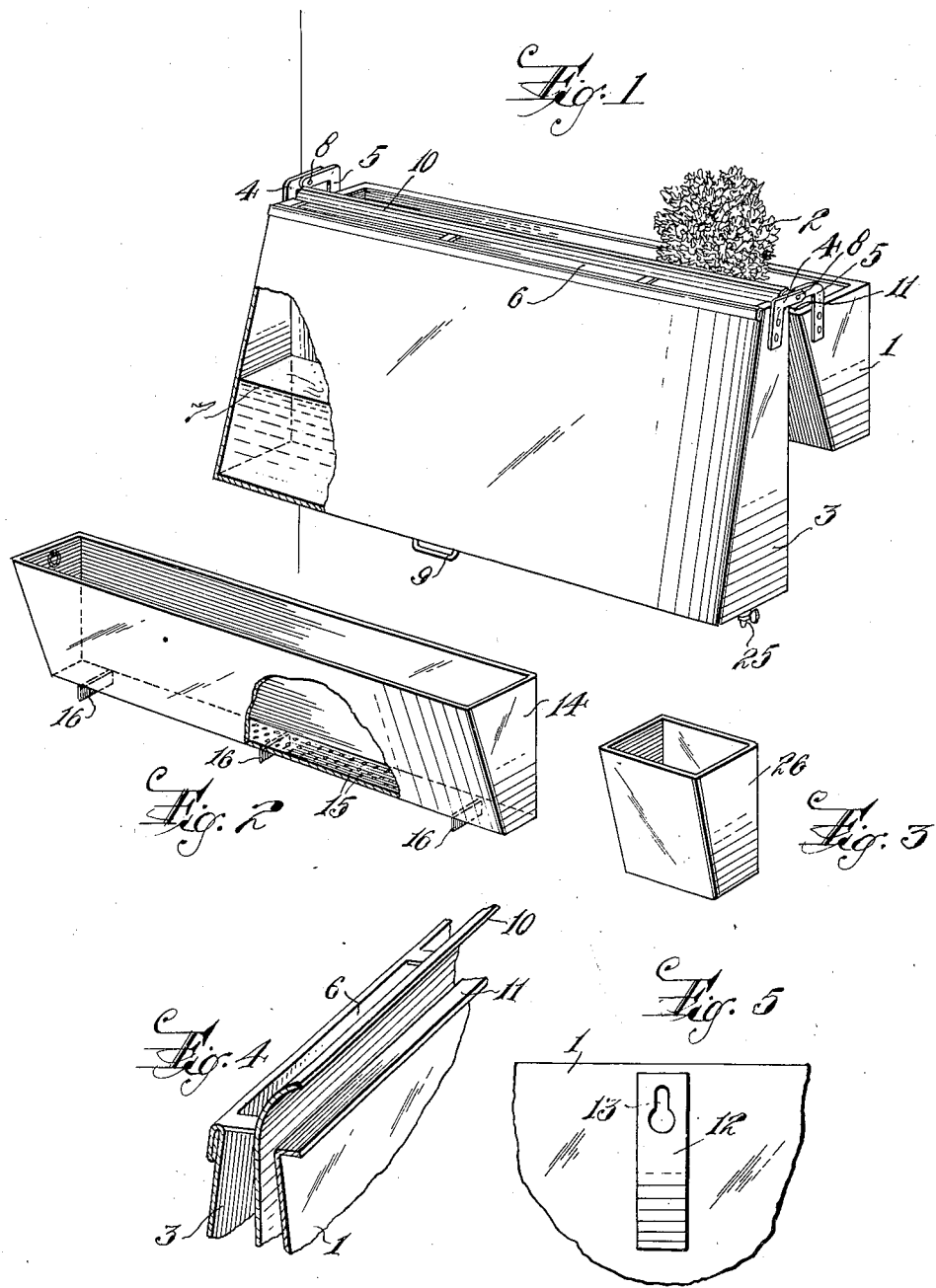
INVENTOR
Victor A. Tiedjens
BY
A. D. T. Libby
ATTORNEY Aug. 13, 1940.　　　V. A. TIEDJENS　　　2,211,445
STRUCTURE FOR GROWING PLANTS IN INERT MATERIAL
Filed Dec. 22, 1938　　　2 Sheets-Sheet 2
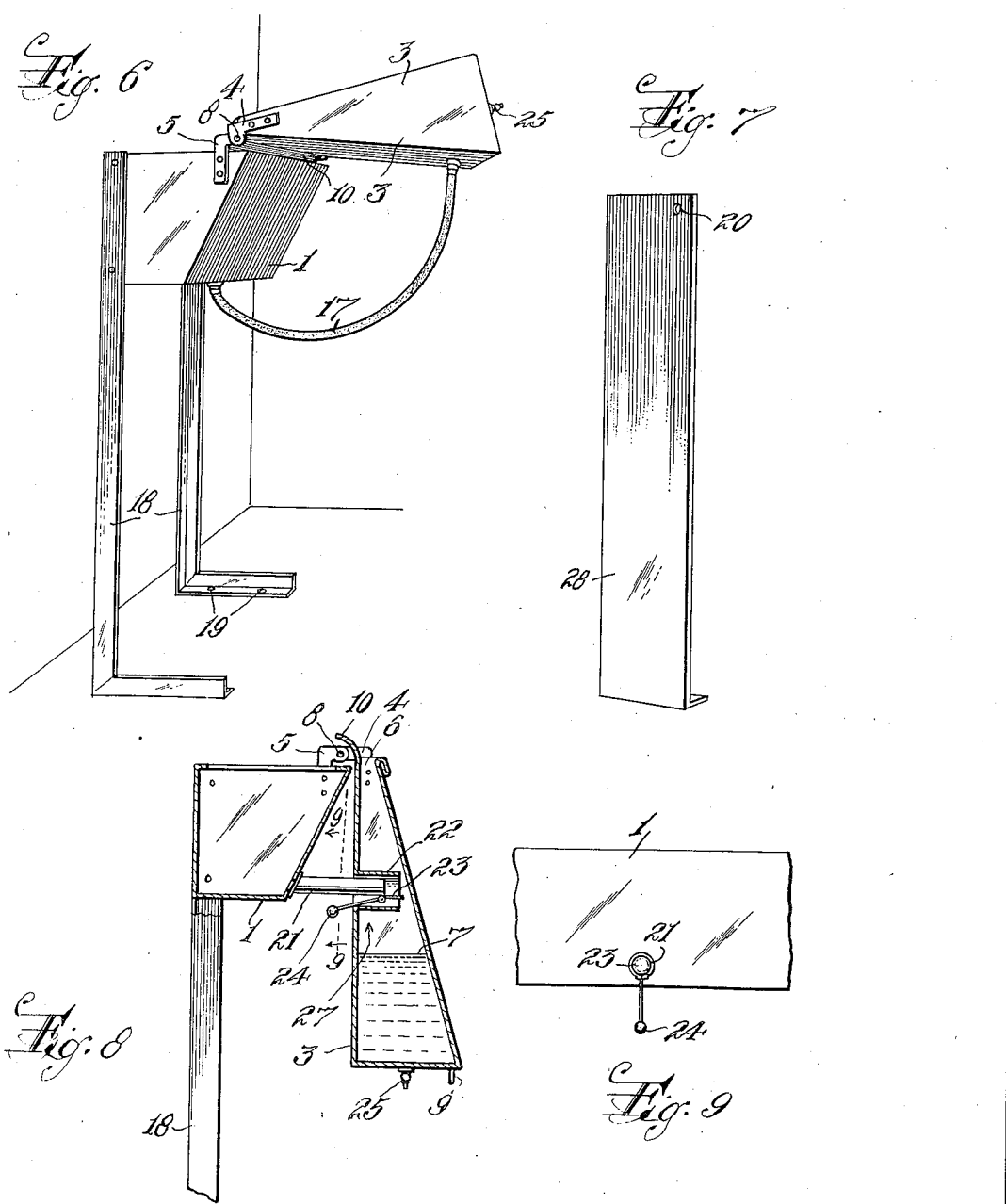
INVENTOR
Victor A. Tiedjens
BY
A. D. T. Libby
ATTORNEY Patented Aug. 13, 1940

2,211,445

UNITED STATES PATENT OFFICE 2,211,445

STRUCTURE FOR GROWING PLANTS IN INERT MATERIAL

Victor A. Tiedjens, Cranbury, N. J.

Application December 22, 1938, Serial No. 247,190

8 Claims. (Cl. 47—38)

This invention relates to means for growing plants in inert material such as sand or cinders by having a combination structure such that a nutrient solution may be readily applied to the plants carried by one portion of the structure.

It is the principal object of my invention to provide a structure of the type to be described which is suitable for household use in living rooms, school rooms, hotel lobbies and other places. While it is old in the art for commercial florists, that is, those running hot-houses, to feed nutrient solutions to plants set in inert materials, as far as I am aware no structure or apparatus has been made which will be satisfactory for use in the home and other places previously indicated, and my invention is thus directed to filling this want.

In the drawings:

Figure 1 is a perspective view of one form of my apparatus or structure which is adapted to be mounted on the side of a wall.

Figure 2 is a perspective view of a liner or container adapted to fit in the box portion of the structure shown in Figure 1.

Figure 3 is a view of an individual plant container suitable for placement in the box of Figure 1.

Figure 4 is a fragmentary perspective view of the upper portion of the solution receptacle, with a side portion of the box.

Figure 5 is a view of a holding clamp which may be used with the box shown in Figure 1 for holding it on the studs fastened in the wall.

Figure 6 is a perspective view of a structure similar to that shown in Figure 1, but showing a different method of mounting or supporting the same.

Figure 7 is a modified form of bracket for supporting the structure in a manner similar to that shown in Figure 6.

Figure 8 is a view, part in section and part in elevation, of the structure such as shown in Figues 1 and 6, showing a slight modification thereof.

Figure 9 is a fragmentary view on the line 9—9 of Figure 8.

Coming now to the details wherein like numbers refer to corresponding parts in the various views, 1 is a plant box of any suitable shape for carrying plants therein, one such plant, numbered 2, being indicated in position. The box 1 may be made of any suitable material, such as galvanized steel, preferably coated on the inside with a material which will prevent corrosion by the nutrient solution which is carried in the receptacle 3. The receptacle 3 has a bracket 4 at each end which is adapted to be pivoted to brackets 5 fastened to opposite ends of the box 1.

The nutrient solution receptacle 3, as shown, has a cross-section similar to a triangle, except that the two opposite sides do not meet at the point, but closely thereto, forming an exit slot or elongated opening 6 through which the solution indicated at 7 may be passed into the box 1 by swinging the receptacle 3 about the pivots 8. A handle or grip 9 is provided on the receptacle 3 for the purpose of swinging it to cause the solution 7 to pass into the box 1 which contains the inert material and the plants. To insure that none of the nutrient solution is spilled over the edge of the box 1 during the pouring operation, a longitudinal lip 10 is provided on the receptacle 3, as shown in Figure 4, whereby when the solution comes out of the slot 6, it spreads slowly and gently over the lip 10 into the box 1 which may be provided with a ledge 11 to prevent any splashing of the solution over the edge of the box.

As shown in Figure 5, the wall side of the box 1 is provided with suitable strips 12 having a bayonet type of slot 13 therein to receive the headed studs fastened in the wall, so that the box may be hooked into place over these studs.

In Figure 2 I have shown a liner 14 which is adapted to fit within the box 1 to carry the plants, the idea being that in some places, such as in schools and hotel lobbies, it may be desirable to change the kinds of plants at intervals, in which case the liner with its plants may be withdrawn from the box 1 and another liner with different plants therein put in its place. The liner 14 has its bottom 15 perforated to allow the nutrient solution to pass outwardly therefrom into the lower part of the box, the liner being spaced from the bottom of the box 1 by spacers 16. An individual plant liner 26 is shown in Figure 3, whereby a single plant may be transferred from one box to another. In this case, the bottom of the liner 26 is perforated and provided with spacers, as in Figure 2.

For the purpose of transferring or carrying back the nutrient solution from the box 1 to the receptacle 3, a flexible hose-like connector 17 is provided, one end of it being joined to the lower portion of the box 1 at a suitable point, and the other end being connected to a suitable part of the receptacle 3, about as indicated in Figure 6. After the nutrient solution has been passed into the box 1, by tipping the receptacle to the position shown in Figure 6, the receptacle is then returned to its normal idle position shown in Figure 1, and the nutrient solution, after a time of approximately fifteen minutes to an hour, will pass back into the receptacle 3. The number of times that the plants are treated depends on the types of plants, the temperature of the room and other conditions, but in the ordinary home treatment of the plants by the nutrient solution is only required once or twice a day.

As shown in Figure 6, the box 1 is supported on L-shaped brackets 18 which are fastened to the floor in any satisfactory manner as by bolts passing through the holes 19. The brackets 18 may be fastened to the box 1 in any satisfactory manner as by bolting or spot-welding.

In Figure 7 I have shown a different type of bracket 28 which is in the form of a plate, the upper end of which may be fastened in any satisfactory manner as by spot-welding, or riveting to the end of the box 1. The lower end of the plate 28 is bent over to form a foot on which the plate rests. The upper end is provided with a hole 20 adapted to receive a pivot pin carried by the receptacle 3 or its supporting bracket.

In place of the flexible hose connection 17, the box 1 may be provided with a permanently fixed stub-pipe 21 which is adapted to loosely telescope with a cooperative stub-pipe 22 securely fastened to the rear wall of the receptacle 3 somewhat as shown in Figure 8, and extending nearly across the interior portion of the receptacle. In this form, when the receptacle 3 is swung about its pivot to pass the solution 7 into the box 1, a valve 23, carried by the pipe 21, automatically closes, due to the weight 24, and prevents any drip from the box 1 passing out the pipe 21 onto the floor during the interval when the receptacle 3 is raised to the discharge position. When the receptacle 3 is returned to the position shown in Figure 8, the valve 23 is automatically opened, as will be readily understood from the drawing, without further description. When the receptacle 3 is moved about its pivot to pass the solution 7 into the box 1, the fluid will move on the inner side of the receptacle in the direction of the arrow 27 toward the slot opening 6, and none of it will pass out of the pipe 22 which, as has been stated, extends substantially across the receptacle and, as a matter of fact, might be anchored at the top edge to the outer wall of the receptacle as the slant of this wall is such as to leave the lower edge of the pipe 22 open. In order to change the nutrient solution or to empty the receptacle 3, a drain cock 25 may be provided.

In the claims, where I have referred to a plant box or plant box portion, this is intended to mean the box 1 per se or the box equipped with a single liner as shown in Figure 2, or a plurality of liners as shown in Figure 3, for when these devices or structures are used and in place, they form part of the box which also includes its means of support.

From what has been said, it will be obvious that certain of the details may be varied, as well as the shape of the box, its supports and the receptacle, without departing from the spirit of my invention or the scope of the appended claims.

What I claim is:

1. A structure for the purpose described including, a box for carrying the plants and a receptacle for carrying a fluid useful to the plants in the box and being pivotally and continuously supported in depending relation on a part of the structure and longitudinally thereof so the receptacle can be moved to pass the fluid therein into the plant box, and means for passing the fluid back to the receptacle after it has been restored to normal position.

2. A structure for the purpose described including, a box for carrying the plants and a receptacle extending longitudinally of the box for carrying a fluid useful to the plants in the box and being pivotally supported for rotation thereabout on a part of the structure so the receptacle can be moved to pass the fluid therein into the plant box to simultaneously treat all the plants in the box, and a flexible tube of suitable length inter-connected between a low part of the plant box and a suitable part of the receptacle for returning the fluid to the receptacle after it has been restored to normal idle position.

3. A structure for the purpose described including, a box for carrying the plants and a receptacle for carrying a nutrient plant solution pivotally supported on a part of the structure so the receptacle can be moved to pass the solution therein into the plant box, and means for passing the solution back to the receptacle after it has been restored to normal position, said means comprising a pair of telescopic tubes, one connected to the bottom of the plant box and extending into the other tube which extends a substantial distance across the interior of the receptacle above the normal level of the solution therein as described.

4. A structure for the purpose described including, a box for carrying the plants and a receptacle for carrying a nutrient plant solution pivotally supported on a part of the structure so the receptacle can be moved to pass the solution therein into the plant box, and means for passing the solution back to the receptacle after it has been restored to normal position, said means comprising a pair of telescopic tubes, one connected to the bottom of the plant box and extending into the other tube which extends a substantial distance across the interior of the receptacle above the normal level of the solution therein, and a valve for the end of the plant box pipe automatically actuated to close the said pipe when the receptacle is lifted, and to open the pipe when the receptacle is returned to normal idle position after the solution is poured into the plant box.

5. A structure for the purpose described including, in combination a box for carrying plants therewithin, with means for suporting said box and a receptacle for carrying a fluid suitable for the plants in the box, the receptacle extending longitudinally of the box and being mounted on on the box portion so the receptacle can be swung about over the top of the box and the fluid therein poured into the box along its length, and means inter-connecting the box and receptacle to return the fluid in due course to the receptacle in its normal resting position.

6. A structure for the purpose described including, in combination a box for carrying plants therewithin, with means for supporting said box and a receptacle for carrying a nutrient plant solution pivoted on the box portion so the receptacle may be moved to cause the solution therein to run into the plant box, a lip located at the pouring edge to properly direct the solution into the plant box, and means for automatically returning the fluid after a time from the box to the receptacle when in its normal idle position.

7. A structure for the purpose described including, in combination a box for carrying plants therewithin, with means for supporting said box and a receptacle for carrying a nutrient plant solution, said receptacle having a cross-section approaching that of a triangle wherein two opposite sides come nearly together forming a narrow slot-like opening, the receptacle being pivoted to the box portion near the opposite ends of said slot, so the receptacle can be moved to cause the solution therein to pass through the slot into the box, means for insuring that the solution will be properly directed into the box, and means for automatically returning, after a time, the solution to the receptacle after it is returned to idle position.

8. A structure as set forth in claim 1, further characterized in that removable plant-containing liner is provided for the box, the liner having a perforated bottom and spacers on the bottom to provide a space between the bottom of the box and the bottom of the liner to receive the solution as it passes through the inert material.

VICTOR A. TIEDJENS.